United States Patent [19]
Yamamoto et al.

[11] Patent Number: 5,058,356
[45] Date of Patent: Oct. 22, 1991

[54] DECORATIVE STRUCTURE

[75] Inventors: Masaharu Yamamoto; Taichi Ikeya, both of Shizuoka, Japan

[73] Assignee: Yamaha Corporation, Hamamatsu, Japan

[21] Appl. No.: 314,973

[22] Filed: Feb. 24, 1989

[30] Foreign Application Priority Data

Feb. 25, 1988 [JP] Japan .................................. 63-44716

[51] Int. Cl.⁵ ............................................. E04B 1/38
[52] U.S. Cl. ........................................ 52/511; 52/508; 52/713; 52/775
[58] Field of Search ................ 52/511, 508, 775, 507, 52/489, 506, 713

[56] References Cited

U.S. PATENT DOCUMENTS 4,312,165  1/1982  Mizusawa .............................. 52/511
4,717,301  1/1988  Oddenino .............................. 52/511

Primary Examiner—Michael Safavi
Attorney, Agent, or Firm—Burns, Doane, Swecker & Mathis

[57] ABSTRACT

A decorative structure comprising a structural member, and a decorative member composed of a plurality of layers laminated on one another and including a reinforcing layer, wherein the structural member and the decorative member to each other are coupled together by means of a portion of the structural member and a portion of the decorative member, the portion of the structural member and the portion of the decorative member being held in engagement with each other, the portion of the reinforcing layer being at least in part formed by a portion of the reinforcing layer, such portions of the structural member and decorative member forming a groove and protrusion or mortise and tenon joint or being fastened together by a mechanical fastening element such as a screw, a bolt or a stud.

2 Claims, 10 Drawing Sheets

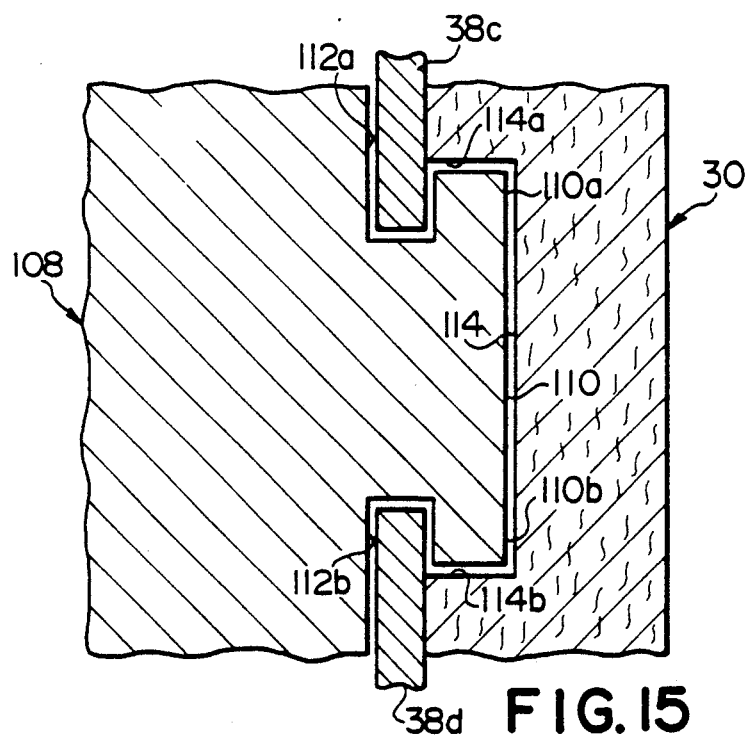
FIG. 15
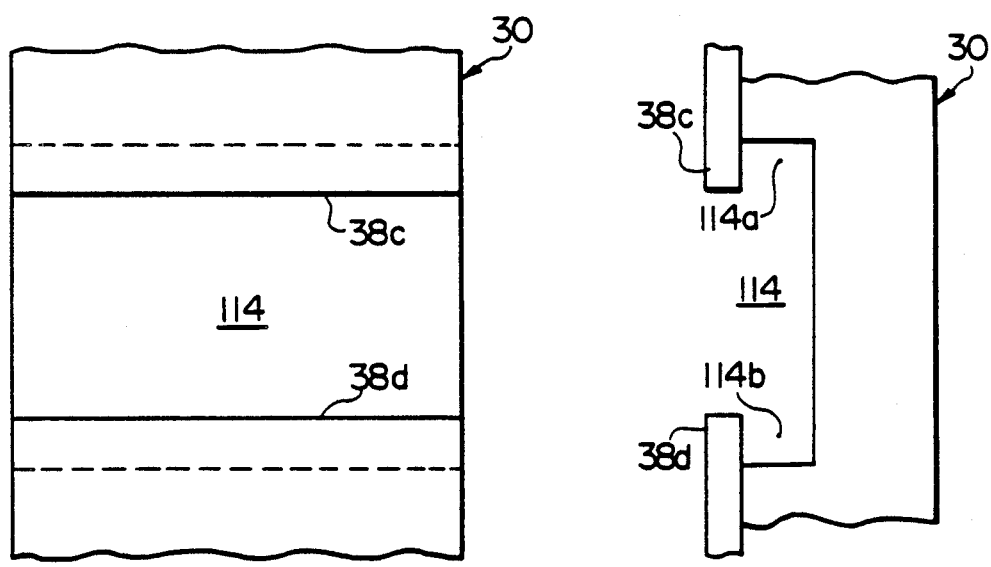
FIG. 16A
FIG. 16B

DECORATIVE STRUCTURE

FIELD OF THE INVENTION

The present invention relates to a structure comprising an inner structural member and an outer decorative member attached to the inner structural member. While such a combination of members may find a wide variety of practical applications, a structure according to the present invention as will be hereinafter described is to be implemented typically by an interior structural member of a vehicle body and a decorative member fixedly attached thereto.

BACKGROUND OF THE INVENTION

A vehicle body is ordinarily equipped with various interior decorative members attached to the structural members forming part of the vehicle body. Typical of such internal decorative members is a composite plywood board lined with a decorative web and having a fixture attached to the inner face of the plywood board by means of staples or studs or with use of an adhesive. The plywood board is assembled to any structural member of the vehicle body with the fixture on the board secured to the vehicle structural member by suitable fastening means.

Where the fixture is thus secured to the plywood board by means of staples or studs, there is a likelihood that cracks or scratches may be produced on the decorative outer surface of the plywood board due to the impacts caused with the stables or studs driven into the board. Such cracks or scratches will impair not only the external appearance and the decorative effect of the plywood board but the mechanical strength with which the board is to be secured to the structural member of the vehicle body. In order, furthermore, that the fixture be properly located on the plywood board, it necessary to use an extra jig for holding the fixture in correct position with respect to the plywood board while the fixture is being fastened to the board. It may also be added that the depths to which the stables or studs are driven into the plywood board may vary from one stable or stud to another. Such irregularity in the driving depths of the staples or studs directly results in irregularity in the mechanical strength with which the fixture is coupled to the board and accordingly in the mechanical strength with which the plywood board is fastened to the structural member of the vehicle body.

Problems are also encountered where the fixture is secured to the plywood board with use of an adhesive. These problems include the significant reduction in the efficiency of assembling due to the extra period of time required for the setting of the adhesive, the possibility of stains being formed by the adhesive which may flow off the contact surface between the board and fixture, and the undetachability of the fixture from the board after the fixture has once been bonded to the board. The use of a special jig is also necessitated for holding the fixture in correct position with respect to the plywood board while the fixture is being bonded to the board.

The decorative plywood board may be attached to the structural member of the vehicle body simply by means of bolts, screws or studs without use of the fixture between the board and the structural member. Problems also arise in this type of decorative arrangement because of the fact that cracks or scratches tend to be produced on the decorative surface of the plywood board during assembly of the board to the vehicle body structure or after the board has been attached to the vehicle body structure. The tendency of cracks being produced after the board has been attached to the vehicle body structure is pronounced especially where the plywood board uses a decorative coating of polyester.

SUMMARY OF THE INVENTION

It is, accordingly, an important object of the present invention to provide an improved decorative structure having an excellent external appearance and an adequate mechanical strength.

It is another important object of the present invention to provide an improved decorative structure featuring a decorative member which can be easily and reliably secured to a structural member of, for example, a vehicle body.

It is still another important object of the present invention to provide an improved decorative structure comprising a decorative member which can be attached to a structural member of, typically, a vehicle body without use of any additional member which may otherwise have to be secured to the decorative member by means of stables, bolts, screws or studs or with use of an adhesive.

It is still another important object of the present invention to provide an improved decorative structure in which is minimized the possibility of cracks or scratches being produced on the decorative outer surface of the decorative member during assembly of the decorative member to a structural member of, for example, a vehicle body structure or after the decorative member has once been assembled to the vehicle body structure.

It is still another important object of the present invention to provide an improved decorative structure in which a decorative member has no additional member so that the decorative structure can be assembled without use of any extra jig which would otherwise have to be used for locating the additional member correctly on the decorative member during assembly of the additional member to the decorative member.

It is still another important object of the present invention to provide an improved decorative structure which comprises a decorative member fitted to a structural member with sufficient and uniform mechanical strength established therebetween.

It is still another important object of the present invention to provide an improved decorative structure which can be assembled with significantly enhanced efficiency without the possibility of stains being formed thereon.

It is still another important object of the present invention to provide an improved decorative structure comprising a decorative member which is undetachably secured to a structural member to allow separation, if desired, of the decorative member from the structural member after the decorative member has once been bonded to the structural member.

In accordance with the present invention, there is provided a decorative structure comprising a) a structural member, b) a decorative member composed of a plurality of layers laminated on one another and including a reinforcing layer, and c) coupling means for coupling the structural member and the decorative member to each other, the coupling means comprising a portion of the structural member and a portion of the decorative member, the portion of the structural member and the portion of the decorative member being held in engagement with each other, the portion of the decorative member being at least in part formed by a portion of the reinforcing layer.

In a preferred embodiment of a decorative structure according to the present invention, the structural member has a protrusion forming the portion of the structural member and in which the decorative member is formed with a groove defined by the portion of the decorative member and substantially conforming in cross section to the protrusion, the groove extending throughout the thickness of the reinforcing layer and having the protrusion received therein.

In another preferred embodiment of a decorative structure according to the present invention, the coupling means comprises a mechanical fastening element which is formed separately of and held in engagement with both of the structural member and the decorative member.

BRIEF DESCRIPTION OF THE DRAWINGS

The drawbacks of a prior-art decorative structure and the features and advantages of a decorative structure according to the present invention will be more clearly understood from the following description taken in conjunction with the accompanying drawings in which like reference numerals designate similar or corresponding structures, members and elements and in which:

FIG. 15 is a fragmentary cross sectional view showing a portion of a seventh preferred embodiment of a decorative structure according to the present invention;

FIG. 16A is a fragmentary plan view showing the inner surface configuration of the decorative member which forms part of the decorative structure illustrated in FIG. 15;

FIG. 16B is a fragmentary side elevation view of the decorative member illustrated in FIG. 16A.

DESCRIPTION OF THE PRIOR ART

Figure 1:
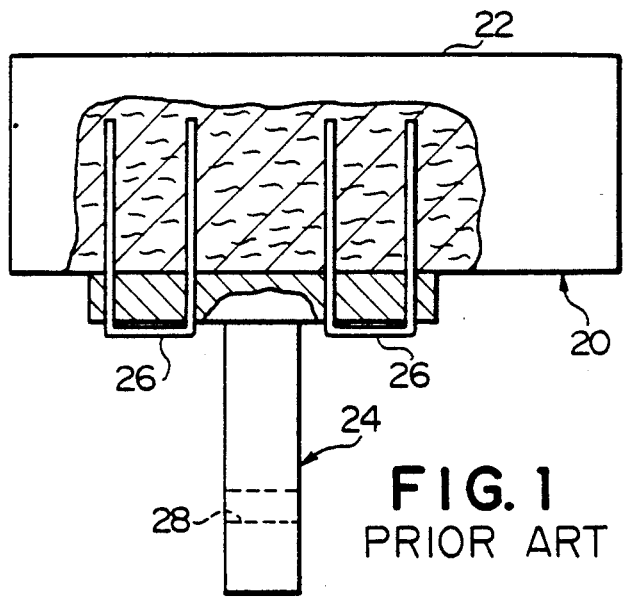
FIG. 1 is a partially cut-away side elevation view showing a prior-art decorative structure using an additional member, or fixture, attached to a structural member by means of staples.

The drawbacks of a decorative structure using an additional member, or fixture, attached to a structural member by means of staples or studs will be reviewed in more detail in regard to a prior-art decorative structure illustrated in FIG. 1.

The prior-art decorative structure herein shown is made up of a composite plywood board 20 having an outer face lined with a decorative web 22. The composite plywood board 20 further has a fixture 24 attached to the inner face of the plywood board by means of staples 26. Though not shown in the drawings, the plywood board 20 having the fixture 24 thus attached thereto is assembled to any structural member of, typically, a vehicle body. For this purpose, the fixture 24 on the board 20 may be secured to the vehicle structural member by suitable fastening means such as bolts, nuts or studs through an opening 28 which may be provided in the fixture 24 as shown.

Where the fixture 24 is thus secured to the plywood board 20 by means of the stables 26, cracks or scratches may be produced in the decorative web 22 on the plywood board 20 due to the impacts caused with the stables 26 driven into the board 20 through a portion of the fixture 24. As has been noted at the outset of the description, such cracks or scratches will impair not only the external appearance and the decorative effect of the plywood board 20 but the mechanical strength with which the plywood board 20 is to be secured to the structural member of the vehicle body. In order, furthermore, that the fixture 24 be properly located on the plywood board 20, it required to use an extra jig (not shown) for holding the fixture 24 in correct position with respect to the plywood board 20 while the fixture 24 is being fastened to the board 20 with the staples 26 driven through the fixture 24 into the board 20. Where, furthermore, the depths to which the stables 26 are driven into the plywood board 20 vary from one stable to another, there would result irregularity in the mechanical strength with which the fixture 24 is coupled to the plywood board 20 and accordingly in the mechanical strength with which the plywood board 20 is fastened to the structural member of the vehicle body.

Problems are also encountered where the fixture 24 is secured to the plywood board 20 with use of an adhesive (not shown) in lieu of the mechanical fastening means such as the staples 26. As has been pointed out previously, these problems include the significant reduction in the efficiency of assembling due to the extra period of time required for the setting of the adhesive, the possibility of stains being formed by the adhesive which may flow off the contact surface between the board 20 and fixture 24, the undetachability of the fixture 24 from the board 20 after the fixture 24 has once been bonded to the board 20, and the use of a special jig also necessitated for holding the fixture 24 in correct position with respect to the plywood board 20 while the fixture 24 is being bonded to the board 20.

Though not shown in the drawings, the decorative plywood board 20 may be attached to the structural member of the vehicle body simply by means of bolts, screws or studs without use of the fixture 26. In this instance, there are problems in that cracks or scratches tend to be produced on the decorative surface of the plywood board 20 as has also been noted previously.

The present invention contemplates elimination of all these problems that have been inherent in prior-art decorative structures of the described natures. Description will be hereinafter made regarding some preferred embodiments of a decorative structure proposed by the present invention to achieve such an end. Prior to entering description of the embodiments, it should be borne in mind that, while each of the embodiments described is assumed to be applied to the body structure of an automotive vehicle, the combination of an inner structural member and an outer decorative member to form part of a decorative structure according to the present invention will find a wide variety of practical applications other than the application in an automotive vehicle.

DESCRIPTION OF THE PREFERRED EMBODIMENTS

Figure 2:
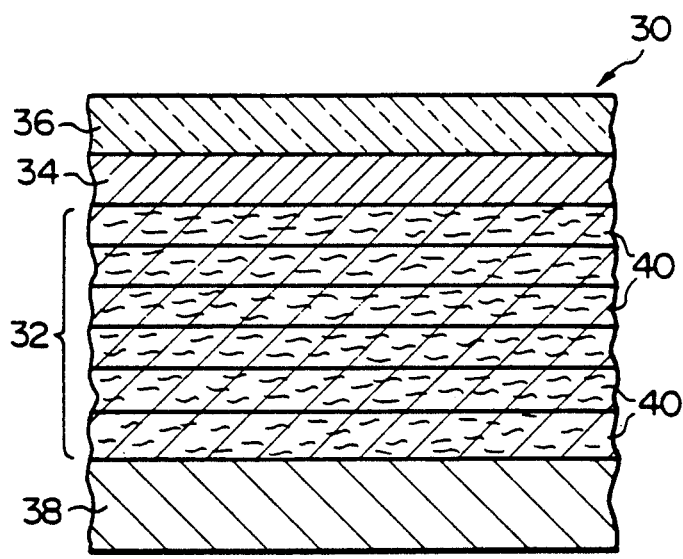
FIG. 2 is a fragmentary cross sectional view showing a portion of a preferred example of an outer decorative member which may form part of a decorative structure according to the present invention.

In FIG. 2 is illustrated a portion of a preferred example of an outer decorative member 30 which may form part of a decorative structure according to the present invention. As shown in FIG. 2, the outer decorative member 30 largely comprises a core assembly 32 having parallel outer and inner faces, a decorative layer 34 bonded or otherwise secured to the outer face of the core assembly 32, a transparent protective coating 36 formed on the decorative layer 34, and a reinforcing layer 38 bonded or otherwise secured to the inner face of the core assembly 32.

The core assembly 32 may be formed by a laminated structure composed of a plurality of layers laminated on one another and each formed by a core element 40. The layers thus laminated to form the core assembly 32 are shown, by way of example, consisting of six core elements 40 and, furthermore, each of these core elements 40 is assumed to be formed by a thin web of natural wood having a thickness of, for example, about 0.5 mm. Examples of the natural wood thus forming each of the core elements 40 include beech wood, lauan, such as meranti, or linden.

The decorative layer 34 may consist of, for example, a thin sheet of natural wood bonded to the outer face of the outermost one of the core elements 40 and having a thickness of, for example, about 0.5 mm. The transparent protective coating 36 may be formed by application of, for example, polyester to the decorative layer 34 to a thickness of, for example, about 0.5 mm. The reinforcing layer 38 may consist of a sheet of aluminum-based alloy bonded to the inner face of the core assembly 32 and measuring about 0.8 mm in thickness.

The core elements 40 and other component layers of the decorative member 30, thus including the reinforcing layer 38, may be assembled together with use of a suitable adhesive to a total thickness of approximately 4.8 mm.

Figure 3:
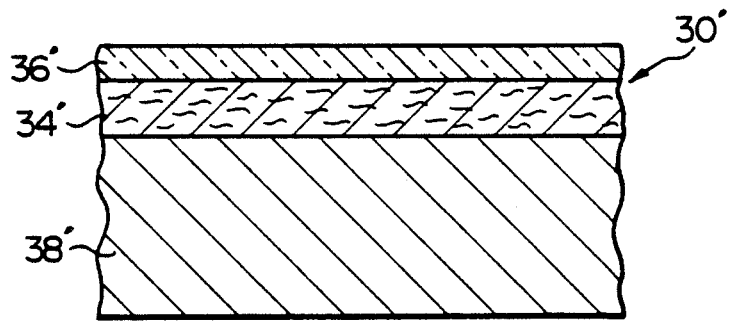
FIG. 3 is a view similar to FIG. 2 but shows a portion of another preferred example of an outer decorative member which may form part of a decorative structure according to the present invention.

FIG. 3 shows a portion of another preferred example of an outer decorative member 30' which may form part of a decorative structure according to the present invention. The outer decorative member 30' herein shown largely comprises a decorative layer 34' having parallel outer and inner faces, a transparent, lusterless protective coating 36' formed on the outer face of the decorative layer 34, and a reinforcing layer 38' bonded or otherwise secured to the inner face of the decorative layer 34'. The decorative layer 34' may consist of, for example, a thin sheet of natural wood having a thickness of, for example, about 0.2 mm. The transparent protective coating 36' may be formed by application of, for example, polyester to the decorative layer 34' to a thickness of, for example, about 0.1 mm. The reinforcing layer 38' may consist of a sheet of aluminum-based alloy bonded to the inner face of the decorative layer 34' and measuring about 1.5 mm in thickness.

The individual component layers of the decorative member 30', thus including the reinforcing layer 38', may be assembled together with use of a suitable adhesive to a total thickness of approximately 1.8 mm.

Generally, the decorative layer forming part of an outer decorative member of a decorative structure according to the present invention, such as the decorative layer 34 in the outer decorative member 30 shown in FIG. 2 or the decorative layer 34' in the outer decorative member 30' shown in FIG. 3, may have a thickness within the range of about 0.2 mm to about 1.0 mm and may consist of a thin sheet of walnut such as typically American walnut, teak, rosewood, elm, mahogany, or camphorwood, each preferably lined with a backing of non-woven fabric.

On the other hand, the reinforcing layer 38 may generally consist of a sheet of aluminum, aluminum-based alloy, steel, copper, copper-based alloy, resin treated paper, fiber reinforced thermoplastic synthetic or thermosetting synthetic resin, or sheet molding compound (SMC). A resin treated paper may be phenol impregnated paper or diallylphthalate (DAP) impregnated paper. Examples of fiber reinforced thermoplastic synthetic resin include fiber reinforced polyethylene and polypropylene while examples of fiber reinforced thermosetting synthetic resin include fiber reinforced phenolic resins.

The adhesive which may be used for assembling the component layers of a decorative structure according to the present invention may be any of epoxy resins, polyurethane resins, melamine resin, urea resin, urea-melanine resin, phenolic resins, resorcinol resin, modified polyvinyl acetate, elastomers, and silicone resins.

Furthermore, the decorative member to form part of a decorative structure according to the present invention has a thickness preferably ranging from about 1.5 mm to about 15 mm and may have either flat and uniplanar or two-dimensionally or three-dimensionally curved opposite surfaces depending on the shape of the structural member to which the decorative member is to be applied. The reinforcing layer to form part of such a decorative structure has a thickness preferably ranging from about 0.2 mm to about 2.0 mm and may consist of either a single unitary panel of any of the above specified materials or may be composed of two or more panels of any one or ones of such materials. While the reinforcing layer in each of the decorative structures 30 and 30' illustrated in FIGS. 2 and 3 forms an innermost layer of the structure, the reinforcing layer forming part of a decorative structure according to the present invention may be interposed between any two of the component layers of the decorative structure.

Several preferred embodiments of a decorative structure according to the present invention will be hereinafter described with reference to FIGS. 4 to 17. In each of the embodiments to be described, it is assumed simply by way of example that the decorative member forming part of the decorative structure embodying the present invention is provided in the form of the decorative member 30 hereinbefore described with reference to FIG. 2. Thus, the decorative member 30 included in each of the embodiments to be described is assumed to be composed of a core assembly 32, a decorative layer 34, a transparent protective coating 36, and a reinforcing layer 38, as has been described with reference to FIG. 2. For simplicity of illustration, however, only the reinforcing layer 38 of the decorative member 30 is illustrated with the other component layers of the decorative member 30 schematically shown as if they were in the form of a unitary structure.

Figure 4:
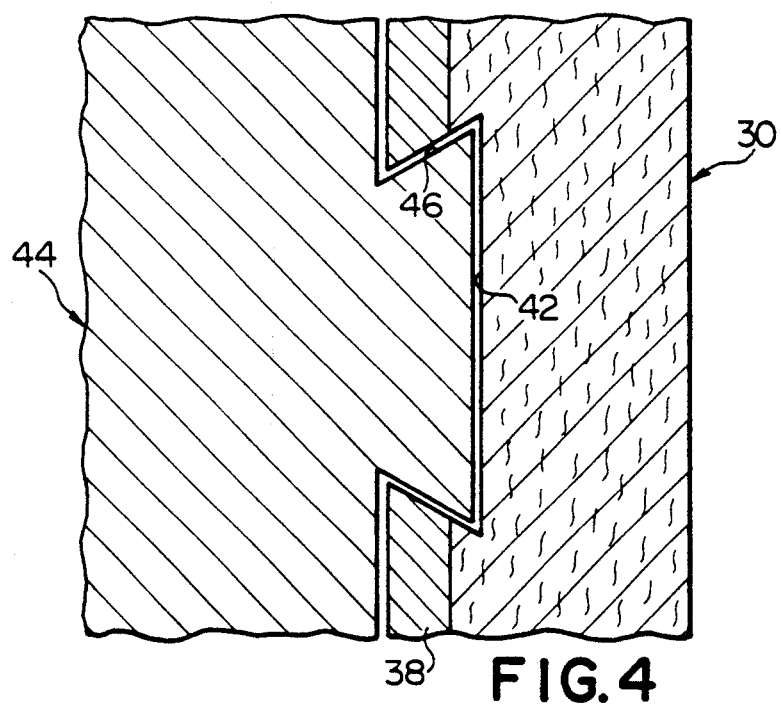
FIG. 4 is a fragmentary cross sectional view showing a portion of a first preferred embodiment of a decorative structure according to the present invention.
Figure 5A:
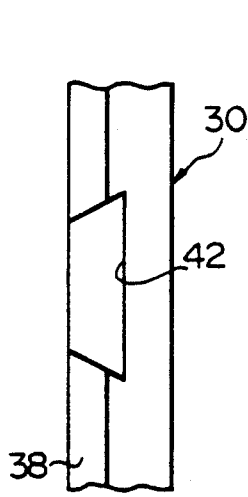
FIG. 5A is a fragmentary side elevation view of the decorative member which forms part of the decorative structure illustrated in FIG. 4.
Figure 5B:
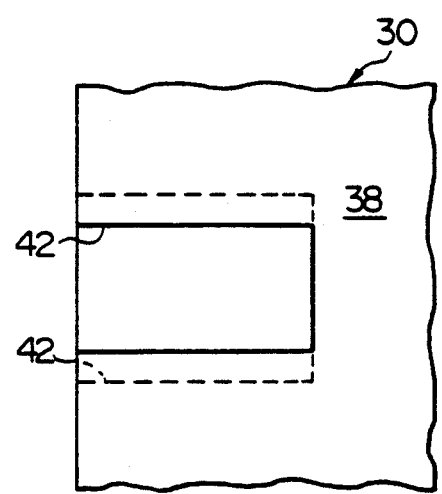
FIG. 5B is a fragmentary plan view showing the inner surface configuration of the decorative member illustrated in FIG. 5A.

FIG. 4 and FIGS. 5A and 5B show a first preferred embodiment of a decorative structure according to the present invention.

In the decorative structure herein shown, the decorative member 30 has a dovetail mortise or groove 42 formed to depthwise extend throughout the thickness of the reinforcing layer 38 into a remaining portion of the decorative member 30 as into any one of the core elements 40 forming the core assembly 32 in the decorative member 30 shown in FIG. 2. The decorative member 30 formed with such a dovetail groove 42 is assembled to a structural member 44 having a protrusion forming a dovetail tenon 46 which conforms in cross section to the dovetail groove 42 and is snugly received in the groove 42 as shown. The structural member 44 to which the decorative member 30 is thus fitted may typically be part of the body structure or of the console box of an automotive vehicle. Alternatively, the structural member 44 may be provided by any coupling member such as a bracket member by means of which the decorative member 30 is secured to the body structure or the console box of an automotive vehicle.

Figure 6A:
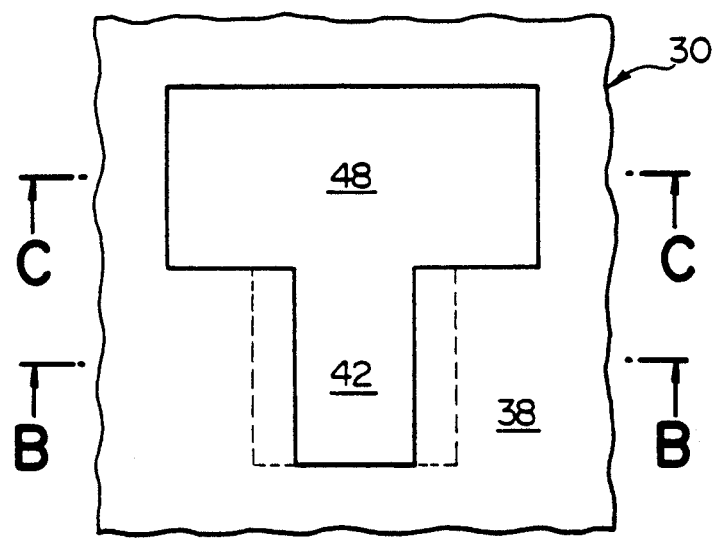
FIG. 6A is a fragmentary plan view showing the inner surface configuration of a portion of a decorative member which forms part of a second preferred embodiment of a decorative structure according to the present invention.
Figure 6B:
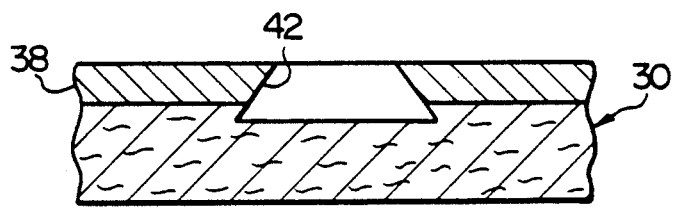
FIG. 6B is a fragmentary cross sectional view taken along line B—B in FIG. 6A.
Figure 6C:
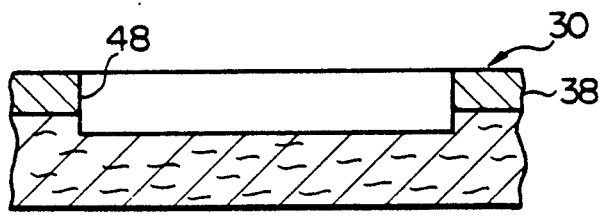
FIG. 6C is a fragmentary cross sectional view taken along line C—C in FIG. 6A.

The dovetail groove 42 in the decorative member 30 may longitudinally extend from an edge portion of the decorative member 30 as shown in FIGS. 5A and 5B. Alternatively, the dovetail groove 42 may lengthwise extend from a concavity 48 additionally formed in the decorative member 30 and merging into the dovetail groove 42 as illustrated in FIGS. 6A to 6C which show a decorative member forming part of a second preferred embodiment of a decorative structure according to the present invention. The concavity 48 is formed to a depth equal to the depth of the dovetail groove 42 and has a width larger than the width of the dovetail groove 42 and accordingly than the width of the dovetail tenon 46 of the structural member 44. The decorative member 30 is thus assembled to the structural member 44 (FIG. 4). In the assembly the dovetail tenon 46 of the structural member 44 is first placed into the concavity 48 and thereafter moved into the dovetail groove 42.

Figure 7:
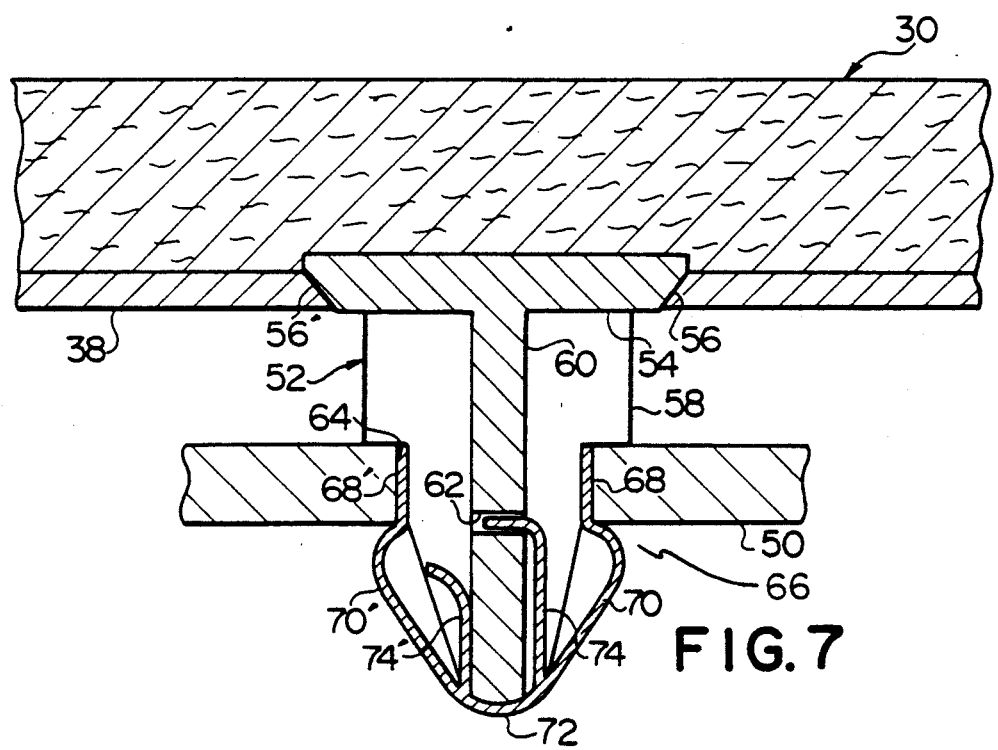
FIG. 7 is a fragmentary cross sectional view showing a third preferred embodiment of a decorative structure according to the present invention.
Figure 8B:
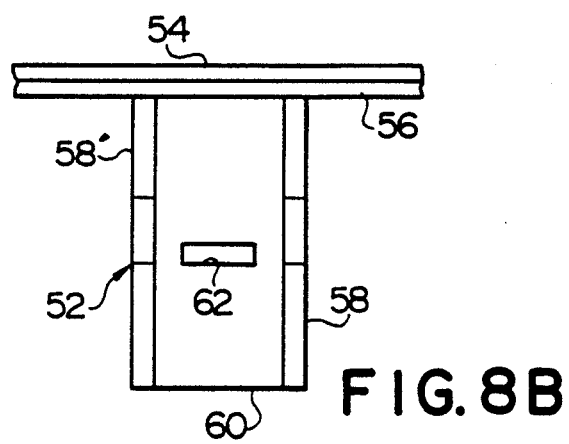
FIG. 8B is a fragmentary side elevation view of the decorative member decorative member used in the decorative structure illustrated in FIG. 7.
Figure 8C:
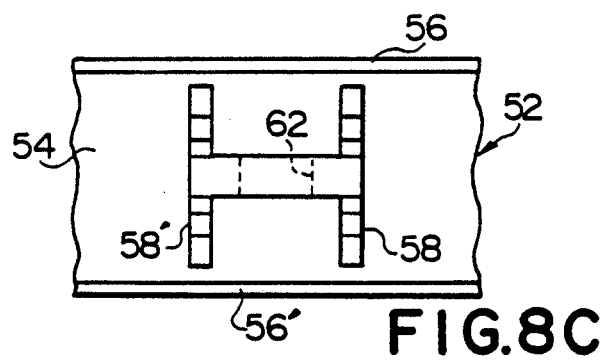
FIG. 8C is a fragmentary plan view showing the inner configuration of the coupling member illustrated in FIGS. 8A and 8B.
Figure 8A:
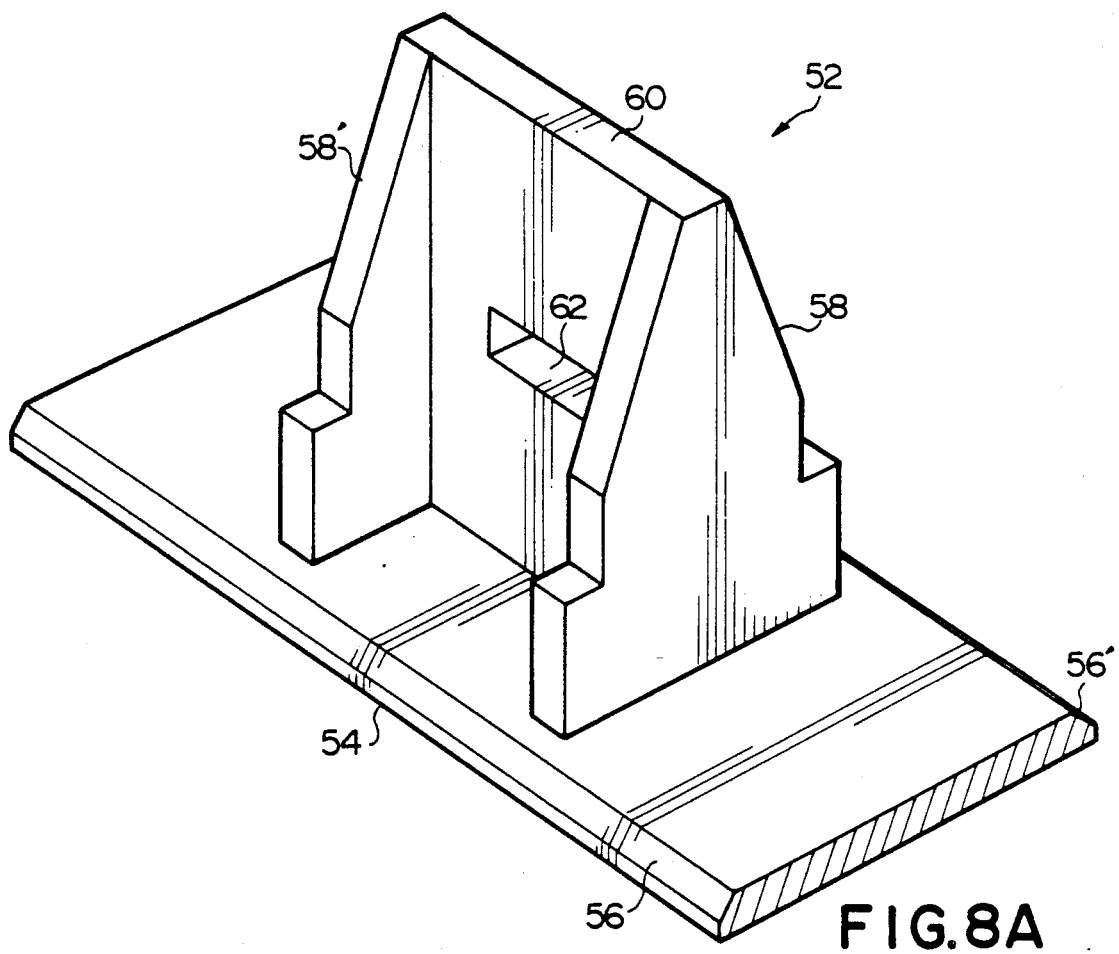
FIG. 8A is a fragmentary perspective view of a coupling member which forms part of the decorative structure illustrated in FIG. 7.

FIG. 7 shows a third preferred embodiment of a decorative structure according to the present invention. The decorative member 30 used in the decorative structure herein shown is per se similar to that included in the decorative structure described with reference to FIGS. 4, 5A and 5B or FIGS. 6A to 6C and has a dovetail groove 42 formed therein. The decorative member 30 in the embodiment of FIG. 7 is assembled to a structural member 50 by means of a coupling member 52 which is shaped as illustrated in FIGS. 8A to 8C. The structural member 50 to which the decorative member 30 is thus fitted may also be part of the body structure or of the console box of an automotive vehicle.

As will be seen from FIGS. 8A to 8C, the coupling member 52 has a generally flat panel portion 54 formed with a pair of parallel edges 56 and 56' inwardly bevelled toward the inner surface of the panel portion 54. The bevelled edges 56 and 56' of the panel portion 54 form a dovetail tenon conforming in cross section to a dovetail groove similar to the dovetail groove 42 and snugly received in the groove as shown in FIG. 7. Due to the provision of the bevelled edges 56 and 56', the inner surface of the panel portion 54 has an area smaller than the area of the outer surface of the panel portion 54.

The coupling member 52 further has a pair of spaced parallel leg portions 58 and 58' projecting from the smaller-area surface of the panel portion 54 and each having a wedgewise reduced end portion. The leg portions 58 and 58' are connected together by an intermediate wall portion 60 projecting from the smaller-area surface of the panel portion 54 and intervening between the leg portions 58 and 58'. The intermediate wall portion 60 is formed with a slot 62 elongated between the leg portions 58 and 58' as shown. The leg portions 58 and 58' and intermediate wall portion 60 are each in part passed through an opening 64 formed in the structural member 50.

As shown in FIG. 7, the coupling member 52 secured to the decorative member 30 with its panel portion 54 fitted into the dovetail groove 42 in the decorative member 30 as above described is further secured to the structural member 50 by the aid of an elastic retaining member implemented by a spring clip 66. The spring clip 66 has a pair of spaced parallel skirt portions 68 and 68' elastically received in the opening 64 provided in the structural member 50. The spring clip 66 further has a pair of outer side portions 70 and 70' merging out of the skirt portions 68 and 68', respectively. These outer side portions 70 and 70' of the spring clip 66 are spaced apart from the opposite faces, respectively, of the intermediate wall portion 60 of the coupling member 54 having its leg portions 58 and 58' and intermediate wall portion 60 projecting each in part from the opening 64 in the structural member 50. The outer side portions 70 and 70' extend toward each other on both sides of the intermediate wall portion 60 of the coupling member 54 to merge into an end portion 72 which has an inner surface portion received on the end face of the intermediate wall portion 60 of the coupling member 52 as shown.

The spring clip 66 further has tag portions 74 and 74' between which the intermediate wall portion 60 of the coupling member 52 is in part received. One tag portion 74 has its end portion bent and received in the slot 62 in the intermediate wall portion 60 of the coupling member 52 and the other tag portion 74' has an end portion bent or curved away from the intermediate wall portion 60 of the coupling member 52. Thus, the coupling member 52 is secured on one hand to the decorative member 30 with its panel portion 54 fitted into the dovetail groove 42 in the decorative member 30 and on the other hand to the structural member 50 by means of the spring clip 66 which is secured in part to the structural member 50 and in part to the intermediate wall portion 60 of the coupling member 52.

Figure 9:
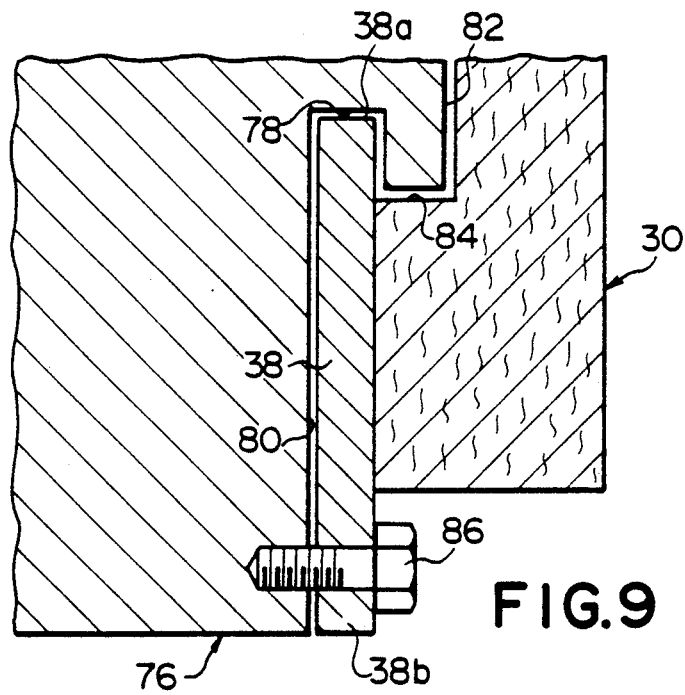
FIG. 9 is a fragmentary cross sectional view showing a portion of a fourth preferred embodiment of a decorative structure according to the present invention.
Figure 10A:
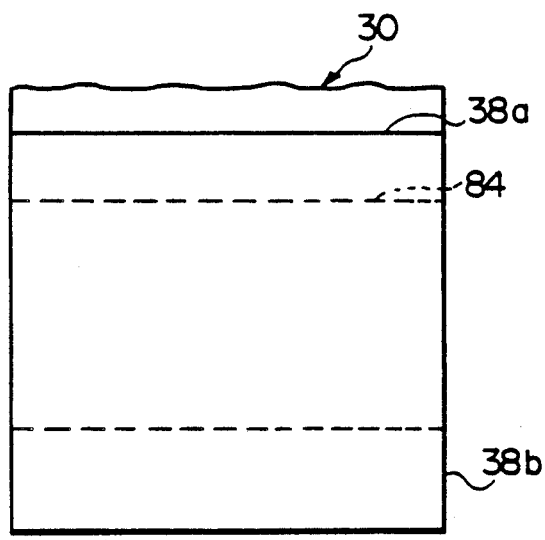
FIG. 10A is a fragmentary plan view showing the inner surface configuration of the decorative member which forms part of the decorative structure illustrated in FIG. 9.
Figure 10B:
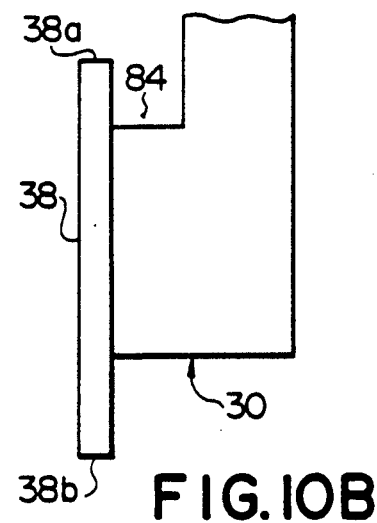
FIG. 10B is a fragmentary side elevation view of the decorative member illustrated in FIG. 10A.

FIG. 9 and FIGS. 10A and 10B show a fourth preferred embodiment of a decorative structure according to the present invention. While the decorative member 30 is secured to the structural member by means of a mortise-and-tenon joint in each of the embodiments hereinbefore described, the decorative member 30 in the decorative structure herein shown is coupled to a structural member, now designated by reference numeral 76, by means of a mechanical fastening element which is formed separately of both of the members 30 and 76.

Referring to FIG. 9, the structural member 76 forming part of the decorative structure herein shown has a groove 78 defined between an end face 80 of the structural member 76 and a side face of a rib portion 82 spaced apart from the end face 80 of the structural member 76. The decorative member 30 for use with the structural member 76 having such a groove 78 also has a groove 84 formed with a portion of the decorative member 30 removed to allow an end portion 38a of the reinforcing layer 38 to have its inner surface exposed along the groove 84 as will be also seen from FIGS. 10A and 10B. The decorative member 30 and structural member 76 formed with the grooves 84 and 78, respectively, are held together with the rib portion 82 of the structural member 76 received in the groove 84 in the decorative member 30 and with the exposed end portion 38a of the reinforcing layer 38 of the decorative member 30 received in the groove 78 in the structural member 76 as shown. The decorative member 30 and structural member 76 being thus held together, the reinforcing layer 38 of the decorative member 30 has its outer face closely attached to the end face 80 of the structural member 76 although the reinforcing layer 38 is shown slightly spaced apart from the end face 80 for clarity of illustration.

The decorative member 30 in the decorative structure shown in FIG. 9 further has a portion removed to allow an opposite end portion 38b of the reinforcing layer 38 to have its inner surface exposed. The decorative member 30 having such an exposed end portion 38b of the reinforcing layer 38 is secured to the structural member 76 by means of a screw 86 fastening the projecting portion 38b of the reinforcing layer 38 of the decorative member 30 closely to the end face 80 of the structural member 76. It may be noted that the screw 86 used in the embodiment herein shown is simply representative of mechanical fastening means applicable to the present invention and, as such, may be substituted by any other form of mechanical fastening element such as a bolt or a stud, though not shown in the drawings.

Figure 11:
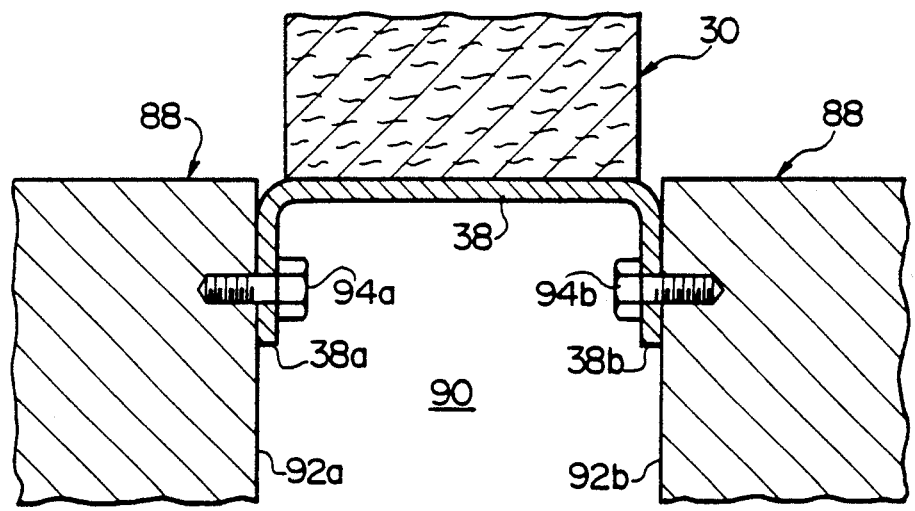
FIG. 11 is a fragmentary cross sectional view showing a portion of a fifth preferred embodiment of a decorative structure according to the present invention.

FIG. 11 shows a fifth preferred embodiment of a decorative structure according to the present invention. The decorative member 30 in the decorative structure herein shown is also coupled to a structural member, now designated by reference numeral 88, by means of mechanical fastening elements formed separately of the members 30 and 88.

Figure 12A:
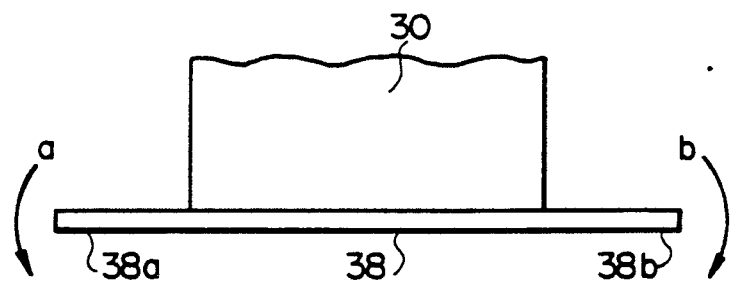
FIG. 12A is a fragmentary view showing the initial configuration of the decorative member which is to form part of the decorative structure illustrated in FIG. 11.
Figure 12B:
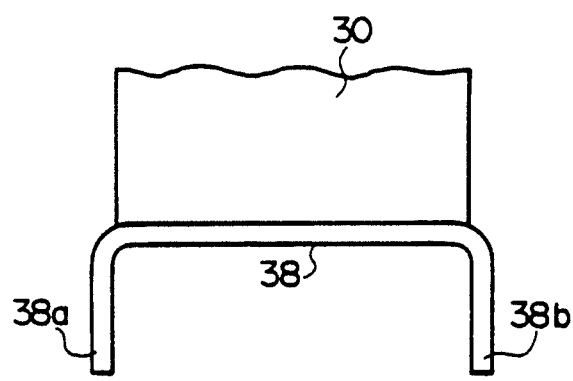
FIG. 12B is a view similar to FIG. 12A but shows the decorative member deformed to be assembled to form part of the decorative structure illustrated in FIG. 12A.

Referring to FIG. 11, the structural member 88 forming part of the decorative structure herein shown has a groove 90 defined between a pair of spaced parallel inner side faces 92a and 92b of the structural member 88. The decorative member 30 for use with the structural member 88 groove 90 has portions removed so that a reinforcing layer 38 has opposite end portions 38a and 38b exposed. The opposite end portions 38a and 38b, which initially extend straight from an intermediate portion of the reinforcing layer 38 are bent in directions indicated by arrows a and b, respectively, in FIG. 12A until they extend perpendicularly to the intermediate portion of the reinforcing layer 38 as shown in FIG. 12B. The decorative member 30 having the reinforcing layer 38 is fitted to the structural member 88 with the perpendicularly bent opposite end portions 38a and 38b of the reinforcing layer 38 attached to the inner side faces 92a and 92b, respectively, of the structural member 88. The decorative member 30 is thus secured to the structural member 88 by means of screws 94a and 94b respectively fastening the portions 38a and 38b of the reinforcing layer 38 closely to the end faces 92a and 92b of the structural member 88. It may be noted that the screws 38a and 38b used in the embodiment herein shown are also simply representative of mechanical fastening means applicable to the present invention and may be substituted by any other form of fastening element such as bolts or studs.

Figure 13:
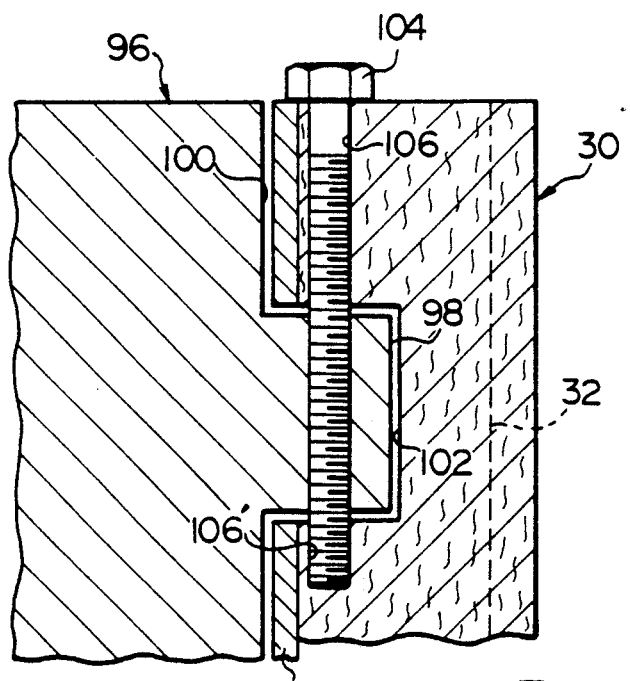
FIG. 13 is a fragmentary cross sectional view showing a portion of a sixth preferred embodiment of a decorative structure according to the present invention.
Figures 14A, 14B:
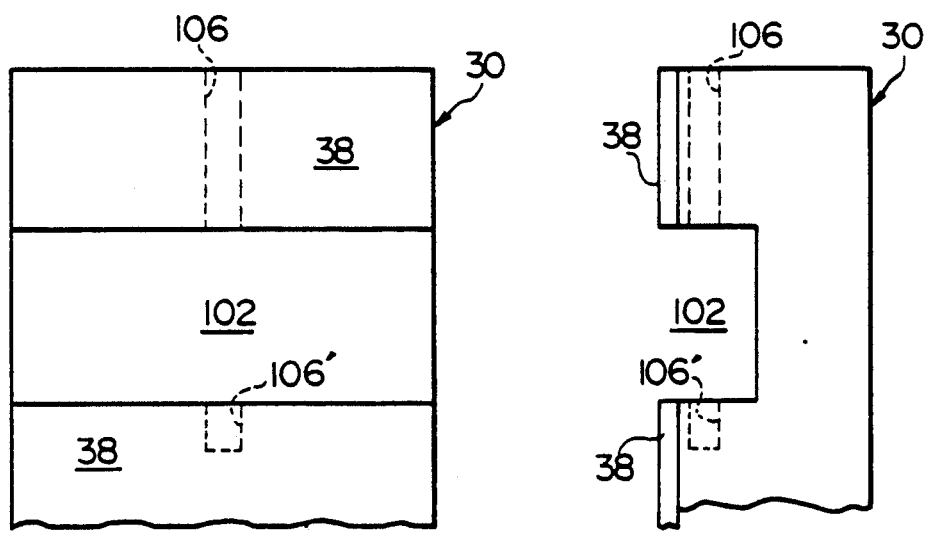
FIG. 14A is a fragmentary plan view showing the inner surface configuration of the decorative member which forms part of the decorative structure illustrated in FIG. 13.
FIG. 14B is a fragmentary side elevation view of the decorative member illustrated in FIG. 14A.

FIG. 13 and FIGS. 14A and 14B show a sixth preferred embodiment of a decorative structure according to the present invention. The decorative member 30 in the decorative structure herein shown is also coupled to a structural member, now designated by reference numeral 96, by means of a mechanical fastening element formed separately of the members 30 and 88.

Referring to FIG. 11, the structural member 96 forming part of the decorative structure herein shown has a protrusion 98 projecting from an end face 100 of the structural member 96. As also shown in FIGS. 14A and 14B, the decorative member 30 to be assembled to the structural member 96 formed with such a protrusion 98 has a groove 102 having a rectangular cross section and extending throughout the thickness of the reinforcing layer 38 into any other component layers of the core assembly 32 (FIG. 2) which forms part of the decorative member 30.

The decorative member 30 having such a groove 102 is fitted to the structural member 96 with the protrusion 98 of the structural member 96 received in the groove 102 in the decorative member 30. The decorative member 30 and structural member 96 thus held together are fastened to each other by means of an elongated screw 104 extending in part through holes 106 and 106' formed in portions of the decorative member 30 in parallel with the reinforcing layer 38 on both sides of the groove 102 and in part through the width of the protrusion 98 of the structural member 96. The reinforcing layer 38 of the decorative member 30 is thus closely attached to the end face 100 of the structural member 96 on both sides of the protrusion 98 of the structural member 96. It may be noted that the screw 104 used in the embodiment herein shown is also simply representative of mechanical fastening means applicable to the present invention and may be substituted by any other form of mechanical fastening element such as a bolt or a stud.

FIG. 15 and FIGS. 16A and 16B show a seventh preferred embodiment of a decorative structure according to the present invention.

In the decorative structure herein shown, the structural member now designated by 108, also has a protrusion 110 which however has lug portions 110a and 110b projecting in opposite directions in parallel with the reinforcing layer 38 of the decorative member 30 to form grooves 112a 112b aligned with each other across the protrusion 110. The decorative member 30 applied to the structural member 108 thus shaped has a recess 114 having a pair of opposite groove portions 114a and 114b which allow end portions 38c and 38d of the reinforcing layer 38 to have their inner surfaces exposed along the groove portions 114a and 114b, respectively, as will be also seen from FIGS. 16A and 16B. The decorative member 30 formed with the grooves 112a and 112b and the structural member 108 formed with the groove portions 114a and 114b are held together with the lug portions 110a and 110b of the protrusion 110 of the structural member 108 received in the groove portions 114a and 114b, respectively, in the decorative member 30 and with the exposed end portions 38c and 38d of the reinforcing layer 38 of the decorative member 30 received in the grooves 112a and 112b, respectively in the structural member 108 as shown. The decorative member 30 and structural member 108 being thus held together, the end portions 38c and 38d of the reinforcing layer 38 of the decorative member 30 have their outer faces closely attached to the surfaces of the structural member 108 defining the grooves 112a and 112b.

Figure 17:
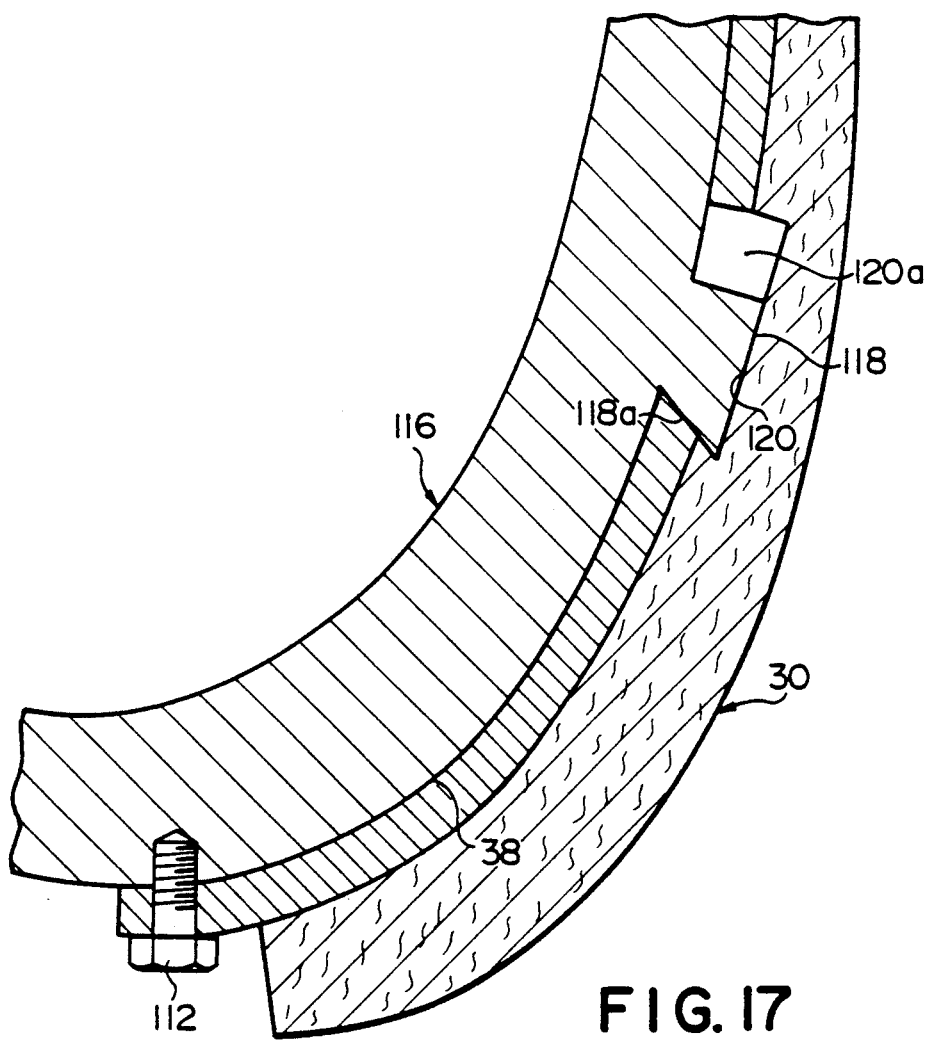
FIG. 17 is a fragmentary cross sectional view showing a portion of an eighth preferred embodiment of a decorative structure according to the present invention.

FIG. 17 shows an eighth preferred embodiment of a decorative structure according to the present invention.

While the decorative member 30 of each of the embodiments which have been described hereinbefore has flat and uniplanar opposite surfaces, the decorative member forming part of a decorative structure according to the present invention may have two-dimensionally or three-dimensionally curved opposite surfaces depending on the shape of the structural member to which the decorative member is to be applied. The embodiment shown in FIG. 17 is characterized by the use of a decorative member 30 having three-dimensionally curved opposite surfaces and may thus be applied to, for example, an ash tray incorporated in the console box of an automotive vehicle. The structural member to which such a decorative member 30 is to be applied is thus assumed to be implemented by a three-dimensionally curved lid member 116 and is thus either in part or in its entirety three-dimensionally curved conformingly to the outer surface of the lid member 116. The lid member 116 has a protrusion 118 having an outwardly bevelled edge portion 118a while the decorative member 30 has a groove 120 formed to depthwise extend throughout the thickness of the reinforcing layer 38 into a remaining portion of the decorative member 30 as into any one of the core elements 40 forming the core assembly 32 in the decorative member 30 shown in FIG. 2. The groove 120 thus formed in the decorative member 30 is shaped to have a dovetail end portion conforming to and closely receiving the outwardly bevelled end portion 118a of the protrusion 118 of the structural member or lid member 116. The groove 120 further has an end portion forming an open space 120a adjacent the opposite end of the protrusion 118 to allow the bevelled end portion 118a into the dovetail end portion of the groove 120 during assemblage of the decorative structure. The decorative member 30 having the protrusion 118 of the lid member 116 thus received in the groove 120 thereof has the reinforcing layer 38 closely received on the curved outer surface of the lid member 116.

The decorative member 30 and lid member 116 held together as above described are secured to each other by suitable mechanical fastening means such as a screw 122 as shown. For this purpose, the decorative member 30 in the embodiment herein shown has an end portion removed to allow an end portion 38a of the reinforcing layer 38 to have its inner face exposed and thus provides a space through which the screw 122 is driven through the end portion 38a of the reinforcing layer 38 into the lid member 116.

While each of the embodiments of a decorative structure according to the present invention has been described as being applied to the body structure of an automotive vehicle, it will be apparent that the subject matter of the present invention is useful for any other applications.

What is claimed is:

1. A decorative structure comprising
a) a structural member,
b) a decorative member composed of a plurality of layers laminated on one another and including a reinforcing layer, and
c) coupling means for coupling said structural member and said decorative member to each other, said coupling means comprising a portion of said structural member and a portion of said decorative member, the portion of the structural member and the portion of the decorative member being held in engagement with each other, said portion of the decorative member being at least formed by a portion of said reinforcing layer, and said structural member being formed with an opening defined by said portion of the structural member, said decorative member further being formed with a groove defined by said portion of the decorative member, said groove extending throughout the thickness of said reinforcing layer, said coupling means further comprising:
a coupling member having a generally flat panel portion received in said groove in said decorative member, a pair of spaced parallel leg portions projecting from said panel portion, an intermediate wall portion projecting from said panel portion and intervening between said leg portions, said intermediate wall portion being formed with a slot, each of said leg portions and said intermediate wall portion being in part passed through said opening in said structural member, and
an elastic retaining member having a pair of skirt portions which are spaced apart substantially in parallel from each other and which are elastically received in said opening in said structural member, a pair of outer side portions merging out of said intermediate wall portion of said coupling member, and an end portion merging out of said outer side portions and received on the end face of the intermediate wall portion of said coupling member, and two tag portions having said intermediate wall portion of the coupling member received therebetween, one of said tag portions having its end portion bent and received in said slot in said intermediate wall portion of the coupling member.

2. A decorative structure as set forth in claim 1, in which said panel portion of said coupling member has a pair of parallel edges inwardly bevelled toward the inner surface of the panel portion to form a dovetail tenon conforming in cross section to and received in said groove in said decorative member.

* * * * *